J. C. GRIBBEN.
HOSE COUPLING.
APPLICATION FILED MAR. 14, 1911.

1,002,264.

Patented Sept. 5, 1911.

Witnesses

Inventor
John C. Gribben.
By Bonnhardt & Co.
Attorneys

UNITED STATES PATENT OFFICE.

JOHN C. GRIBBEN, OF LAKEWOOD, OHIO.

HOSE-COUPLING.

1,002,264.  Specification of Letters Patent.  Patented Sept. 5, 1911.

Application filed March 14, 1911. Serial No. 614,468.

*To all whom it may concern.*

Be it known that I, JOHN C. GRIBBEN, a citizen of the United States, residing at Lakewood, in the county of Cuyahoga and State of Ohio, have invented certain new and useful Improvements in Hose-Couplings, of which the following is a specification.

This invention relates to hose or pipe couplings, and especially to such couplings having a locking bayonet joint which cannot become accidentally unfastened, and which can be readily and easily attached or detached when desired. The coupling is also provided with improved means for packing the joint.

Figure 1:
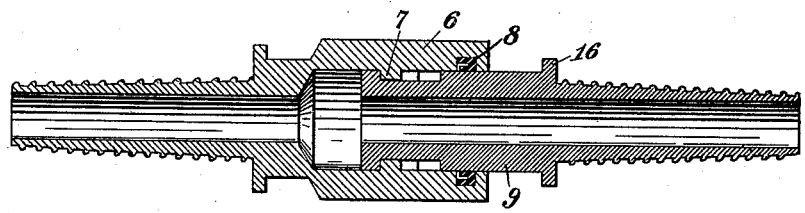
Figure 2:
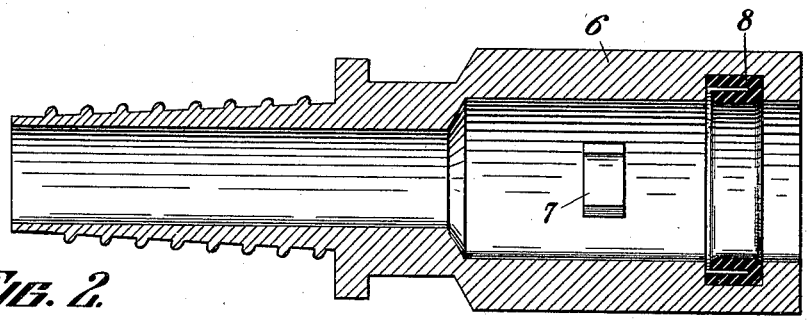
Figure 3:
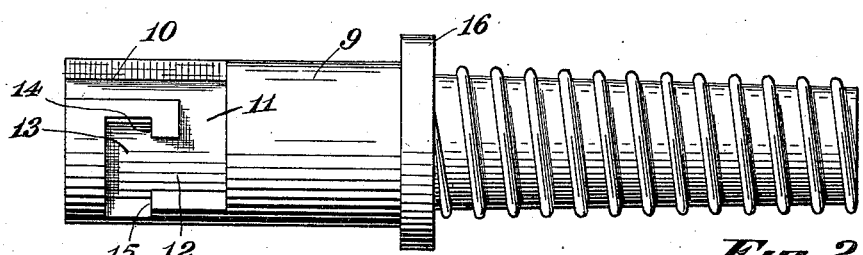
Figure 4:
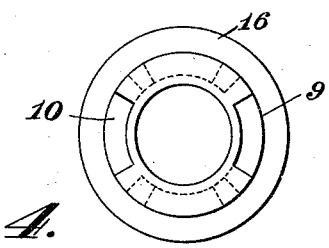

In the accompanying drawings—Figure 1 is a longitudinal section of the parts of the coupling locked together. Fig. 2 is a longitudinal section of the female member. Fig. 3 is a plan view of the male member. Fig. 4 is an end view of Fig. 3.

The hose or pipe sections to be united are connected respectively to the coupling members, one of which, the female member, comprises a sleeve 6 having inwardly projecting lugs 7 located at opposite sides thereof, and at about the middle of its length. Between the lugs and the end of the sleeve is a packing ring 8 set in a groove in the sleeve, and inclined inwardly so that the pressure of any fluid within the pipe will bind the packing against the male member to form a tight joint.

The male member comprises a plug 9, turned to fit at a close fit within the bore of the part 6, and on its opposite sides it is provided with bayonet grooves of special construction. Each groove has a longitudinal entering part 10 which leads to a segmental groove 11 at right angles thereto, and at the end of the part 11 is a longitudinal part 12, which extends forwardly or toward the end of the member and terminates in a segmental part 13 which extends in both directions from the end of the part 12, forming shoulders 14 and 15 at the rear edge thereof. A shoulder 16 is formed on the male member between the plug and the nipple which receives the hose. The plug is of course bored to allow passage of the fluid.

In attaching the coupling the plug 9 is slipped in the sleeve 6 and the lugs 7 enter the groove 10. The parts are then turned slightly causing the lugs to follow the grooves 11 to the end thereof and the parts are then pulled outwardly causing the lugs 7 to slide through the grooves 12 into the cross grooves 13, after which the parts are turned slightly in either direction to engage the lugs 7 behind the shoulders 14 or 15, in which position the members are locked together, and prevented from moving either way.

To detach the coupling, the parts must be turned to register the lugs 7 with the grooves 12, then the members are pushed together and turned to pass the lugs through the grooves 12 and 11, and finally the parts are pulled apart to pass the lugs out through the grooves 10.

The coupling is free from the objections incident to an ordinary bayonet lock, because if the parts are accidentally turned when attached the lugs 7 will pass from one end of the grooves 13 to the other, and in either position will engage behind the shoulder 14 or 15, and in any event cannot under any circumstances become detached unless the parts are first pushed together, turned and then pulled apart, whereas with an ordinary bayonet groove movement of the hose or pipe on the ground will sometimes cause the lugs to turn to position to slip out of the groove when the hose is pulled.

Having thus described my invention, what I claim as new and desire to secure by Letters Patent is:—

A detachable coupling comprising a sleeve having an internal lug, and a plug adapted to fit in the sleeve, said plug having a groove consisting of a longitudinal part 10, a segmental part 11, a forwardly extending longitudinal part 12 and a segmental part 13 at the front end of said forwardly extending part, the segmental part 13 being of greater length than the width of the part 12, whereby shoulders 14 and 15 are formed at opposite sides of the part 12 to lock the lug when the plug is turned either way.

In testimony whereof, I do affix my signature in presence of two witnesses.

JOHN C. GRIBBEN.

Witnesses:
JOHN A. BOMMHARDT,
STEDMAN J. ROCKWELL.

Copies of this patent may be obtained for five cents each, by addressing the "Commissioner of Patents, Washington, D. C."